US012796671B2

(12) United States Patent
Fung

(10) Patent No.: US 12,796,671 B2
(45) Date of Patent: Nov. 17, 2026

(54) BAG WITH INTEGRATED FISHING ROD HOLDERS

(71) Applicant: RIVERBORN OUTDOORS, LLC, Woodland Hills, CA (US)

(72) Inventor: Ian Fung, Woodland Hills, CA (US)

(73) Assignee: RIVERBORN OUTDOORS, LLC, Woodland Hills, CA (US)

(*) Notice: Subject to any disclaimer, the term of this patent is extended or adjusted under 35 U.S.C. 154(b) by 0 days.

(21) Appl. No.: 19/227,671

(22) Filed: Jun. 4, 2025

(65) Prior Publication Data

US 2025/0366455 A1 Dec. 4, 2025

Related U.S. Application Data

(60) Provisional application No. 63/655,710, filed on Jun. 4, 2024.

(51) Int. Cl.
*A01K 97/06* (2006.01)
*A01K 97/08* (2006.01)
*A01K 97/10* (2006.01)
*A45F 3/04* (2006.01)

(52) U.S. Cl.
CPC .............. *A01K 97/06* (2013.01); *A01K 97/08* (2013.01); *A01K 97/10* (2013.01); *A45F 3/04* (2013.01)

(58) Field of Classification Search
CPC ........ A01K 97/06; A01K 97/08; A01K 97/10; A45F 2003/003; A45F 3/04
USPC .................. 43/54.1, 21.2, 26.1; 206/315.11; 224/920, 922, 153
See application file for complete search history.

(56) References Cited

U.S. PATENT DOCUMENTS 2,539,080 A * 1/1951 Hoover .................. A01K 97/10 248/533
2,823,971 A * 2/1958 Hoyt ...................... A01K 97/06 312/290
3,051,422 A * 8/1962 Crump ................... A01K 97/10 248/533
3,532,309 A * 10/1970 Reddick ................. A01K 97/10 248/598
3,802,112 A * 4/1974 Banner .................. A01K 97/10 248/514
3,874,573 A * 4/1975 Fruscella .................. A45F 5/02 224/242
4,085,873 A * 4/1978 Schweitzer .......... A45C 7/0077 294/142

(Continued)

FOREIGN PATENT DOCUMENTS

CN 206238144 U * 6/2017
CN 211353623 U * 8/2020

(Continued)

OTHER PUBLICATIONS

International Search Report from corresponding PCT/US2025/032194 mailed Sep. 10, 2025.

*Primary Examiner* — Darren W Ark
(74) *Attorney, Agent, or Firm* — Lando & Anastasi, LLP

(57) ABSTRACT

A backpack is disclosed. The backpack includes at least one rod holder component attached to a side wall of the bag. Each rod holder component includes one or more rod holders having rigid side walls. Each rod holder is sized and arranged for holding a fishing rod. Each rod holder component includes a base for attaching the rod holder component to the bag.

19 Claims, 19 Drawing Sheets

(56) References Cited

U.S. PATENT DOCUMENTS

| | | | | | |
|---|---|---|---|---|---|
| 4,541,539 | A * | 9/1985 | Matthews | A01K 97/22 | 220/555 |
| 4,749,162 | A * | 6/1988 | Wanzor | A01K 97/10 | 114/364 |
| 5,025,583 | A * | 6/1991 | Langley | A01K 97/12 | 43/17 |
| 5,033,223 | A * | 7/1991 | Minter | A01K 97/10 | 248/538 |
| 5,063,701 | A * | 11/1991 | Ottens | A01K 97/10 | 248/528 |
| 5,131,179 | A * | 7/1992 | McEwen | A01K 97/10 | 248/539 |
| 5,209,009 | A * | 5/1993 | Fast | A01K 97/10 | 43/21.2 |
| 5,275,316 | A * | 1/1994 | Kish | A01K 97/06 | 224/259 |
| 5,305,542 | A * | 4/1994 | Phelps | A01K 97/05 | 43/57 |
| 5,409,291 | A * | 4/1995 | Lamb | A01K 97/10 | 224/652 |
| 5,471,779 | A * | 12/1995 | Downey | A01K 97/22 | 206/315.11 |
| 5,511,336 | A * | 4/1996 | Bishop | A01K 97/10 | 224/680 |
| 5,533,295 | A * | 7/1996 | Hochberger | A01K 97/10 | 248/512 |
| 5,806,827 | A * | 9/1998 | Gilmore | A01K 97/10 | 248/538 |
| 5,813,162 | A * | 9/1998 | Tse | A01K 97/10 | 224/242 |
| 5,975,393 | A * | 11/1999 | Bellamy | A01K 97/08 | 383/41 |
| 6,048,023 | A * | 4/2000 | Lampton | A45C 15/00 | 297/52 |
| 6,082,757 | A * | 7/2000 | Lin | B62B 1/12 | 280/654 |
| 6,217,113 | B1 * | 4/2001 | Knatz | A47C 4/52 | 297/118 |
| 6,487,814 | B1 * | 12/2002 | Arredondo | A01K 97/06 | 206/315.11 |
| 6,595,354 | B1 * | 7/2003 | Scicluna | A47G 25/0607 | 206/289 |
| 7,228,962 | B2 * | 6/2007 | Scicluna | A45C 13/03 | 206/289 |
| 7,415,794 | B1 * | 8/2008 | Thompson | A01K 97/22 | 206/315.11 |
| 8,925,752 | B2 * | 1/2015 | Smith | F25D 23/028 | 220/4.27 |
| 8,943,739 | B2 * | 2/2015 | Blake, III | A01K 97/06 | 224/259 |
| 9,526,236 | B2 * | 12/2016 | Coker | A01K 97/08 | |
| D807,026 | S * | 1/2018 | Lawhorn | D3/216 | |
| 9,914,402 | B1 * | 3/2018 | Jones | B60R 9/08 | |
| 10,034,468 | B1 * | 7/2018 | Pitts | A45F 3/047 | |
| 10,568,313 | B2 * | 2/2020 | Erdmann | B60R 9/08 | |
| 11,026,412 | B1 * | 6/2021 | Diaz | A01K 97/10 | |
| 11,147,255 | B1 * | 10/2021 | Snyder | A01K 97/22 | |
| 11,399,526 | B2 * | 8/2022 | Clark, Jr. | A01K 97/10 | |
| 12,089,581 | B2 * | 9/2024 | Drinkard | A45F 3/04 | |
| 12,302,882 | B2 * | 5/2025 | Erdmann | A45F 3/04 | |
| 2003/0051388 | A1 * | 3/2003 | Barnes | A01K 97/08 | 43/21.2 |
| 2007/0164063 | A1 * | 7/2007 | Concepcion | A45C 15/00 | 224/650 |
| 2007/0205234 | A1 * | 9/2007 | Lessmann | A45F 4/02 | 224/652 |
| 2012/0043358 | A1 * | 2/2012 | Kelly | A01K 97/08 | 224/629 |
| 2012/0047791 | A1 | 3/2012 | Blake | | |
| 2015/0377549 | A1 * | 12/2015 | Cai | A01K 97/06 | 43/17.5 |
| 2016/0113263 | A1 | 4/2016 | Potempa | | |
| 2019/0075773 | A1 * | 3/2019 | Pippins | A01K 97/10 | |
| 2019/0166981 | A1 * | 6/2019 | Revels | A45F 3/10 | |
| 2019/0231054 | A1 * | 8/2019 | Walter | A01K 97/125 | |
| 2020/0187477 | A1 * | 6/2020 | Clark, Jr. | A01K 97/10 | |
| 2022/0142320 | A1 * | 5/2022 | Rusakov | A45C 3/00 | |
| 2022/0361468 | A1 | 11/2022 | Erdmann | | |
| 2024/0276964 | A1 * | 8/2024 | Drinkard | A45F 3/04 | |
| 2025/0176699 | A1 * | 6/2025 | Whitworth | B65D 81/3897 | |

FOREIGN PATENT DOCUMENTS

| | | | | |
|---|---|---|---|---|
| CN | 215873165 | U * | 2/2022 | |
| JP | H10262531 | A * | 10/1998 | |
| JP | 2006288999 | A * | 10/2006 | |
| JP | 2010178648 | A * | 8/2010 | |
| JP | 2013046581 | A * | 3/2013 | |
| JP | 2013123381 | A * | 6/2013 | |
| JP | 2021083350 | A * | 6/2021 | |
| KR | 0137611 | Y1 * | 2/1999 | A01K 97/08 |
| KR | 200189376 | Y1 * | 7/2000 | |
| KR | 200202718 | Y1 * | 11/2000 | |
| KR | 20030021223 | A * | 3/2003 | |
| KR | 20030096199 | A * | 12/2003 | |
| KR | 200376306 | Y1 * | 3/2005 | A01K 97/06 |
| KR | 100784292 | B1 * | 12/2007 | A45C 11/00 |
| KR | 20070119519 | A * | 12/2007 | A01K 97/04 |
| KR | 100890734 | B1 * | 3/2009 | A45C 11/00 |
| KR | 100952582 | B1 * | 4/2010 | A01K 97/04 |
| KR | 20110113242 | A * | 10/2011 | A45C 13/00 |
| KR | 20110117544 | A * | 10/2011 | A45C 11/00 |
| KR | 20170002910 | U * | 8/2017 | A01K 97/10 |
| KR | 20190001510 | U * | 6/2019 | A01K 97/20 |

* cited by examiner

FIG. 2
10
Riverborn
30L | TETRALINE BACKPACK | 4X ROD HOLDERS
Riverborn
12

BAG WITH INTEGRATED FISHING ROD HOLDERS

CROSS REFERENCE TO RELATED APPLICATIONS

This application is a U.S. Non-Provisional Patent application claiming priority to U.S. Provisional Patent Application Ser. No. 63/655,710, filed Jun. 4, 2024. The entire disclosure is hereby incorporated herein by reference in its entirety for all purposes.

BACKGROUND

Bags are manufactured and provided in all shapes, sizes, materials, features, and the like. Some bags are designed for carrying fishing gear including fishing rods.

For example, one bag that is available in the marketplace is a roller tackle bag sold by FishLab. The bag has two wheels, a retractable handle, fishing rod holders, and other features, and is designed to be wheeled like rollable suitcase. A similar type rolling bag, which also has shoulder straps and can be carried like a backpack is sold by Calissa. However, current fishing bags or rod holders are not well designed to carry, secure, and protect multiple fishing rods during transportation and various fishing activities. It is an object of the disclosure to provide an improved bag to be used to carry fishing gear.

FIELD OF THE INVENTION

The present disclosure is related to a backpack for carrying fishing gear, in particular a backpack with integral fishing rod holders.

SUMMARY OF THE INVENTION

It is desirable to provide an improved carrying article, such as a backpack for fishing gear. It is desirable to provide an improved backpack to carry, secure, and protect multiple fishing rods during transportation and staging, while keeping a user's two hands free to cast a fishing rod, to set up tackle, or engage in various other fishing activities. It is desirable to provide an improved backpack that is configured with integrated fishing rod holders that hold fishing rods for storage and transport. It is desirable to provide an improved backpack that is configured with integrated fishing rod holders that provide support to the backpack when set upon a surface or when being used to hold fishing rods when in use.

Aspects and embodiments of a backpack include at least one rod holder component attached to a side wall of the bag. Each rod holder component includes one or more rod holders having rigid side walls. Each rod holder is sized and arranged for holding a fishing rod. Each rod holder component includes a base for attaching the rod holder component to the bag.

Aspects and embodiments include a stitching flange about the periphery of the base component that is stitched to the bag.

Aspects and embodiments include the stitching flange is integral to and on at least two sides of the base.

Aspects and embodiments include the stitching flange is stitched to the side wall of the bag with a continuous stitch surrounding the entire circumference of the rod holder component.

Aspects and embodiments include each rod holder has at least two vertical side walls which are substantially parallel.

Aspects and embodiments include the plurality of side walls of each rod holder form a cylindrical shape.

Aspects and embodiments include the one or more rod holders including a leg element adapted to interface with said rod holders.

Aspects and embodiments include the leg element is adapted to interface with the rod holder via an interface with aligning elements. Aspects and embodiments include the interface includes directional tongue and grooves and a detent with male and female elements.

Aspects and embodiments include the base is detachable from one or more rod holders. Aspects and embodiments include the rod holder is adapted to interface with the base via aligning elements. Aspects and embodiments include the aligning elements include directional tongue and grooves and a detent with male and female elements.

Aspects and embodiments of the backpack include two straps adapted to allow the user to carry the bag on their back as a backpack.

Aspects and embodiments of the backpack include an internal structural element secured to the at least one side of the bag having an attached rod holder component, the structural element having sides parallel to the vertical side walls of the rod holders, and the structural element having a longitudinal face which is perpendicular to the rod holder component.

Aspects and embodiments include a zipper closure that is nylon.

Aspects and embodiments include that the rod holder component is integrally formed.

Aspects and embodiments include that the bag is made of a ballistic nylon.

Aspects and embodiments include that the bag is made of polyester.

Aspects and embodiments include that the bag comprises a lightweight water-resistant material.

Aspects and embodiments include that the rod holder has a rigid bottom. Aspects and embodiments include that the rigid bottom is integrally formed with the rod holder. Aspects and embodiments include that the rigid bottom of the one or more rod holders is a leg element adapted to interface with the rod one or more rod holders. Aspects and embodiments include that the leg element adapted to interface with the rod holder via an interface with aligning elements. Aspects and embodiments include that the interface includes directional tongue and grooves and a detent with male and female elements.

Aspects and embodiments include that the rod holder has an open bottom end.

Aspects and embodiments include that the rod holder has a slot in a top end.

Aspects and embodiments include that the bag includes any one or more of a shoulder strap, a pair of shoulder straps, and a carrying handle.

Aspects and embodiments of the backpack further include shoulder straps.

Aspects and embodiments of the backpack further a carrying handle.

Aspects and embodiments of the backpack further at least one vertical side pocket having a closure.

BRIEF DESCRIPTION OF THE DRAWINGS

Various aspects of at least one embodiment are discussed below with reference to the accompanying figures. The figures are provided for the purposes of illustration and explanation and are not intended as a definition of the limits of the invention. In the figures.

LIST OF REFERENCE NUMERALS UTILIZED IN THE DRAWINGS

Figure 1:
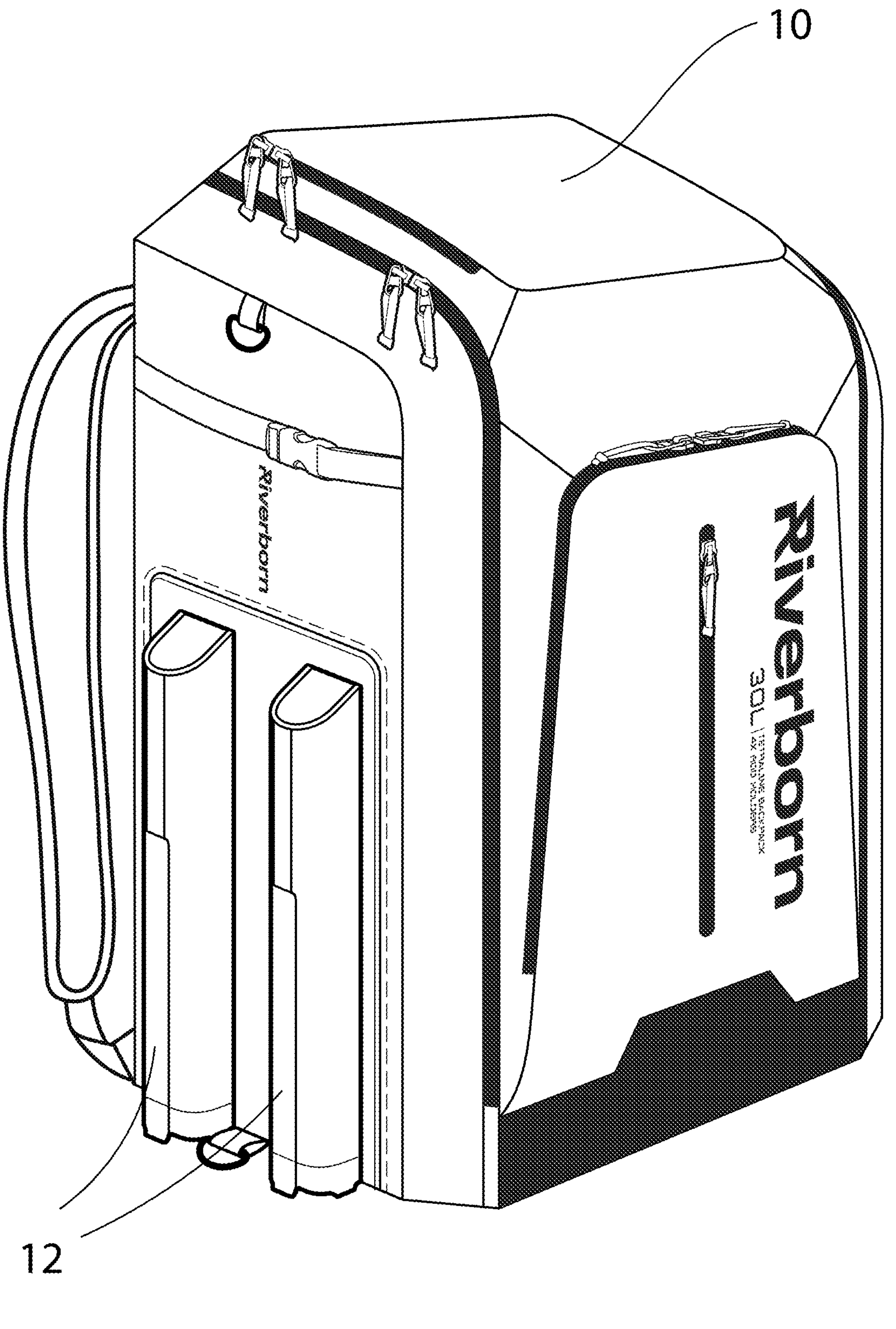
FIG. 1 is a left front perspective view of an embodiment of a backpack in a closed configuration.

With regard to reference numerals used, the following reference numbering is used throughout the description and drawings. Where technical features in the figures or detailed description are followed by these reference numerals, the reference numerals have been included for the sole purpose of increasing the intelligibility of the figures or detailed description. Accordingly, neither the reference numerals nor their absence is intended to have any limiting effect on the scope of any claim elements. In the figures, each similar component (for example a rod holder) that is illustrated in various figures is represented by a like reference numeral, even though the rod holder may have different aspect and embodiments. For purposes of clarity, not every component may be labeled in every figure.

Reference numeral 10 refers to a backpack

Reference numeral 12 refers to a rod holder 12;

Reference numeral 14 refers to a base 14;

Reference numeral 16 refers to a rod holder component;

Reference numeral 18 refers to a flange;

Reference numeral 20 refers to vertical side walls of rod holder;

Reference numeral 22 refers to a bottom of the rod holder;

Reference numeral 24 refers to a detachable leg element of the rod holder;

Reference numeral 26 refers to a portion of a tongue and groove element on the rod holder for the detachable leg element;

Reference numeral 28 refers to a male detent for the detachable leg element;

Reference numeral 30 refers to a portion of the tongue and groove elements on the detachable leg;

Reference numeral 32 refers to female element of the detent element for the detachable leg;

Reference numeral 34 refers to a structural element or panel;

Reference numeral 36 refers to a face of the structural element or panel;

Reference numeral 38 refers to shoulder straps of the backpack;

Reference numeral 40 refers to a carrying strap for carrying the backpack;

Reference numeral 42 refers to a closure;

Reference numeral 44 refers to an internal support;

Reference numeral 46 refers to a rod holder support strap;

Reference numeral 48 refers to a vertical zipper closure;

Reference numeral 50 refers to a top pocket;

Reference numeral 52 refers to a main pocket zipper closure;

Reference numeral 54 refers to a top pocket zipper closure;

Reference numeral 56 refers to a shoulder strap support strap; and

Reference numeral 58 refers to a loop attachment;

Reference numeral 60 refers to a handle;

Reference numeral 62 refers to a base of the backpack;

Reference numeral 64 refers to footings of the backpack;

Reference numeral 66 refers to shoulder strap adjustment loops of the backpack;

Reference numeral 68 refers to a tongue of an embodiment of a rod holder;

Reference numeral 70 refers to a groove of an embodiment of a rod holder;

Reference numeral 72 refers to a direction of engagement of a rod holder with its base;

Reference numeral 74 refers to slot in an embodiment of a rod holder; and

Reference numeral 76 refers to an open bottom of an embodiment of a rod holder.

DETAILED DESCRIPTION

Reference will now be made in detail to representative embodiments of a backpack with integral fishing rod holders as illustrated in the accompanying drawings. It should be understood that the following descriptions are not intended to limit the aspects and embodiments of a backpack to any one preferred embodiment. To the contrary, they are intended to cover alternatives, modifications, and equivalents as may be included within the spirit and scope of the described embodiments as disclosed. It is appreciated that any of the features of any of the embodiments can be used with any of the aspects and embodiments and it is understood that they can so be combined in any manner.

Game fish exhibit a wide range of bait preferences depending on the stage of their life cycle, seasonal movements, angling pressure, and weather conditions. Oftentimes, a lot of hiking and trying out different baits is necessary to locate and target such game fish. Therefore, having multiple fishing rods and baits at the ready is an advantage for angling success. However, current fishing bags or rod holders are not well designed to carry, secure, and protect multiple fishing rods during transportation and staging, while keeping a user's two hands free to cast a fishing rod, to set up tackle, or engage in various other fishing activities. It is an object of the disclosure to provide an improved carrying article, such as a backpack for fishing gear. It is desirable to provide an improved backpack to carry, secure, and protect multiple fishing rods during transportation and staging, while keeping a user's two hands free to cast a fishing rod, to set up tackle, or engage in various other fishing activities.

Aspects and embodiments of the disclosure are directed to a bag with at least one integrated rod holder for holding fishing rods. According to aspects and embodiments, a backpack is configured with at least one rod holder component including at least one rod holder for carrying and/or storage of a fishing rod. Aspects and embodiments include that the rod holder component is configured to provide support and in a non-collapsed state of the backpack. Aspects and embodiments include that the backpack is configured for use when a user wants to carry or store items, particularly related to fishing, including fishing rods.

Figure 2:
FIG. 2 is a right front perspective view of the embodiment of the backpack of FIG. 1.
Figure 3:
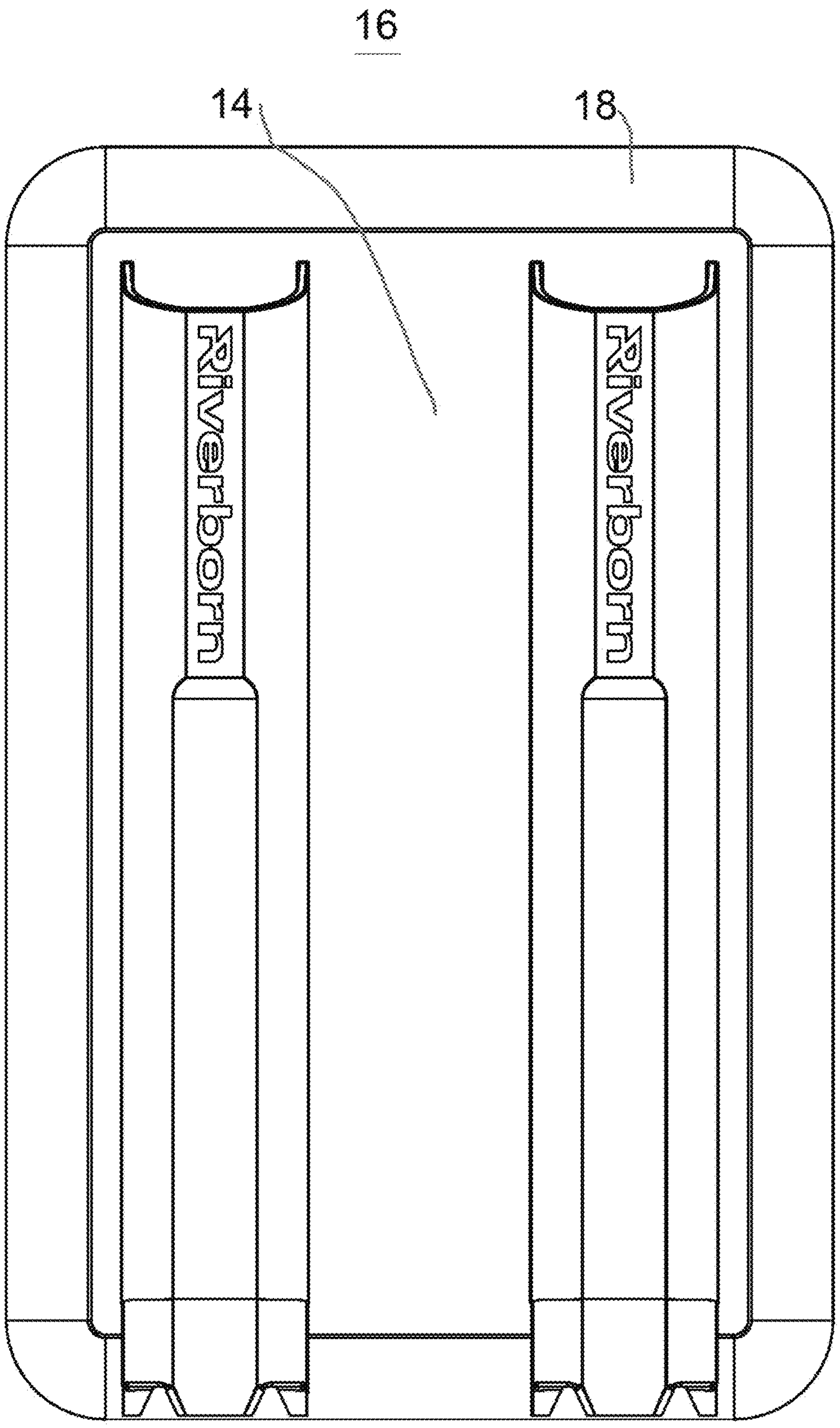
FIG. 3 is a front view of an embodiment of the rod holder component.

According to one embodiment, a bag (10) has four rod holders (12) attached to it, two rod holders on each side of the bag. FIG. 1 is a left perspective view of one embodiment of the bag, and FIG. 2 is a right perspective view of the bag. On each side of the bag there are two rod holders (12), forming a pair of rod holders. Each pair of rod holders is joined by a base (14) such that the pair of rod holders and the base form a continuous integral body which is herein referred to as a rod holder component (16). FIG. 3 illustrates an exploded front view of the rod holder component (16) and FIG. 4 illustrates a top view of the rod holder component including an internal view of the two rod holders (12).

According to aspects and embodiments, each rod holder component (16) has an integrated flange (18) which facilitates the rod holder component to be attached to the bag. For example, according to one embodiment, the rod holder component can be attached to the bag by stitching the flange to the bag around the full perimeter of the flange and without any additional, fastening, supporting, or receiving elements. The stitching of the flange to the bag ensures a rigid attachment and makes the bag less labor intensive to produce.

Figure 4:
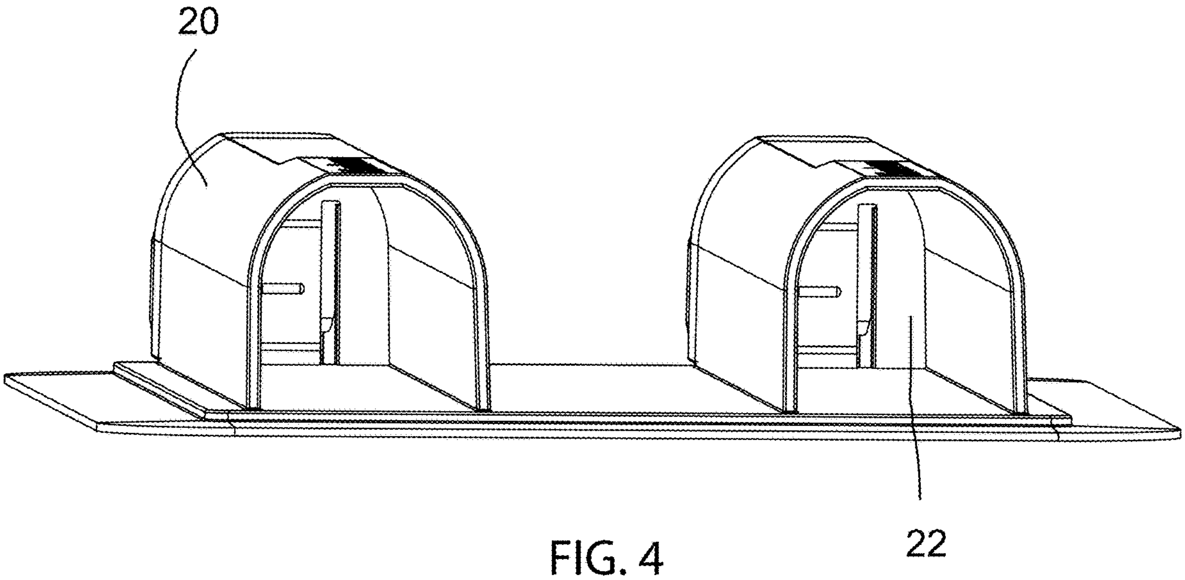
FIG. 4 is a top view of the embodiment of the rod holder component of FIG. 3.
Figure 5:
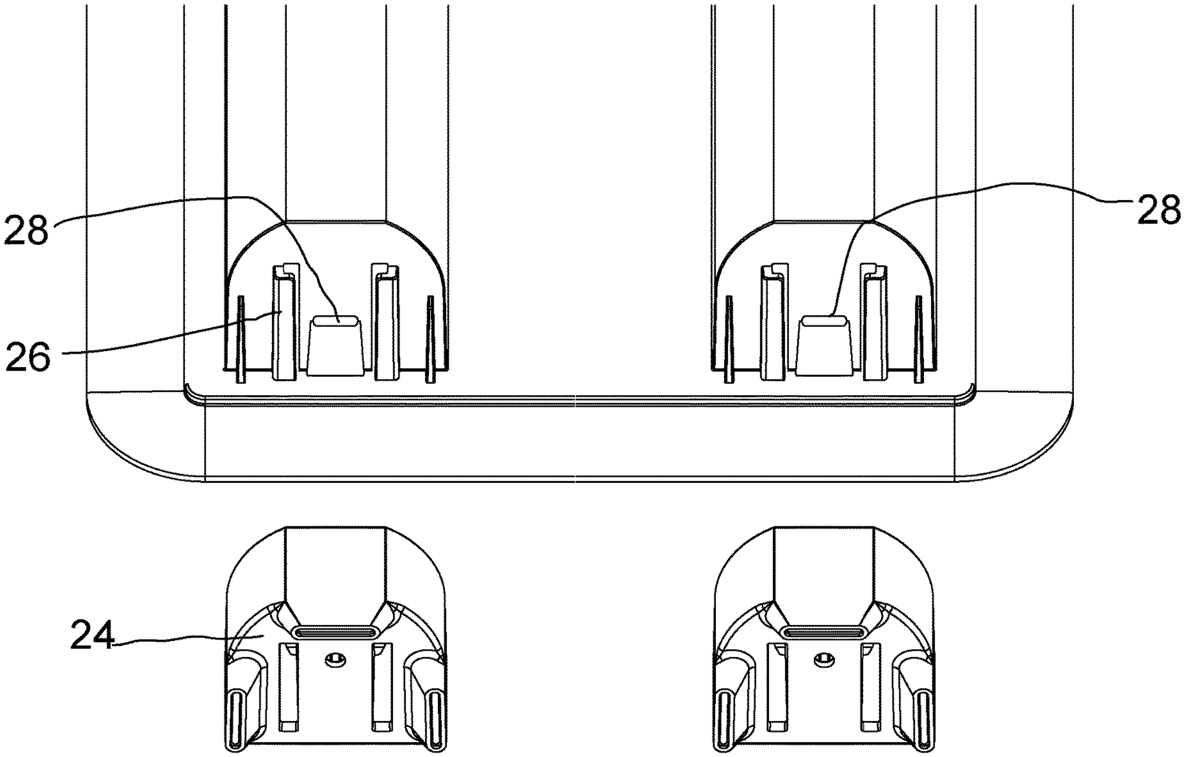
FIG. 5 is a bottom partial view of the embodiment of the rod holder component of FIG. 3.
Figure 6:
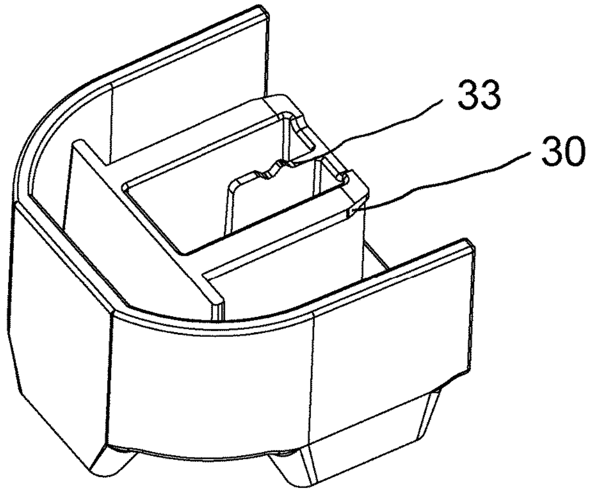
FIG. 6 is a front perspective view of an embodiment of a leg element of a rod holder.

According to aspects and embodiments, each rod holder (12) is molded with vertical parallel side walls (20), on all sides, as shown in FIG. 4. According to aspects and embodiments, the combination of side walls with a given height "H" as shown in FIG. 3 and a rigid bottom (22) as shown in FIG. 4 allows a fishing rod to sit inside the rod holder without damage to the butt of the fishing rod and enables the fishing rod maintain a substantially vertical position, which is ideal for transportation. Typical injection molds with a base and sidewalls of height "H" above 50 mm have built-in sidewall angles of 2 degrees or more, which would render them less suitable for this purpose. According to aspects and embodiments, the rod holders are injection molded utilizing a sliding core to form the rod holder cavity, which enables the sidewalls to have a substantially 1 degree draft, which is an advantage of the rod holders of the disclosure Referring to FIG. 5, there is illustrated an exploded bottom view of the standalone rod holder component. According to aspects and embodiments, each rod holder has a detachable leg element (24), which is attached to a bottom (22) (See FIG. 4) of the rod holder via directional tongue and groove elements (26, 30), and male (28) and female (32) detent elements, which combine to help align leg element to the rod holder and keep the leg element from easily detaching. The detachable leg elements, which is illustrated in FIG. 6, are configured and arranged to contact the ground when the bag is placed on a flat surface and to ensure the rods and the bag are well supported and do not tip over.

Aspects and embodiments of the leg elements include that the leg element can be detached so that the stitching flange, which surrounds the rod holder component, can be easily accessed by a stitching machine to attach the rod holder component to the bag during the manufacturing process. Without being able to detach the leg elements, the stitching flange could not be stitched on all sides as the stitching machine would be impeded by the leg elements. This would cause open gaps in attaching the rod holder component to the bag. and result in reduced structural integrity and usability of the bag.

Figure 19A:
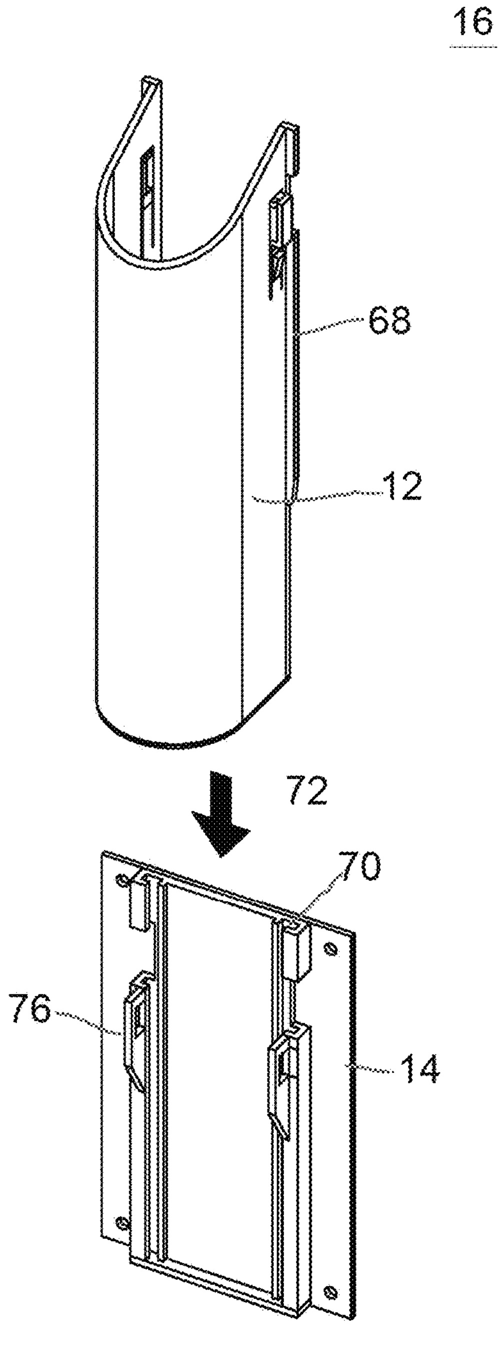
FIGS. 19A-19B illustrate an embodiment of a rod holder component.
Figure 19B:
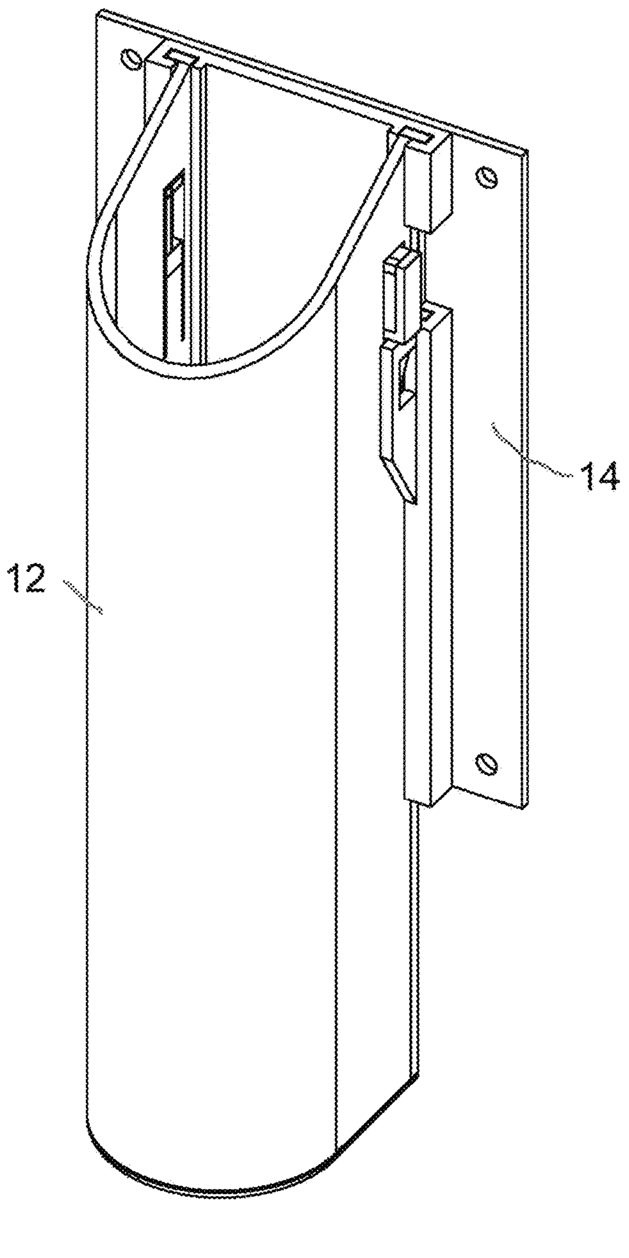

Referring to FIGS. 19A-19B, there is illustrated an exploded perspective view of an embodiment of a rod holder component (16) in an unassembled (FIG. 19A) and assembled (FIG. 19B) state. According to aspects and embodiments, the rod holder component has a detachable rod holder (12), which is attached to a base (14) of the rod holder component via directional tongue (68) and groove elements (70), and a detent with male (76) and female elements (not illustrated), which combine to help align and secure the rod holder to the base and keep the rod holder from easily detaching. Aspects and embodiments of the base (14) include that the base can be detached from the rod holder so that the base can be attached to the bag during the manufacturing process.

Figure 20A:
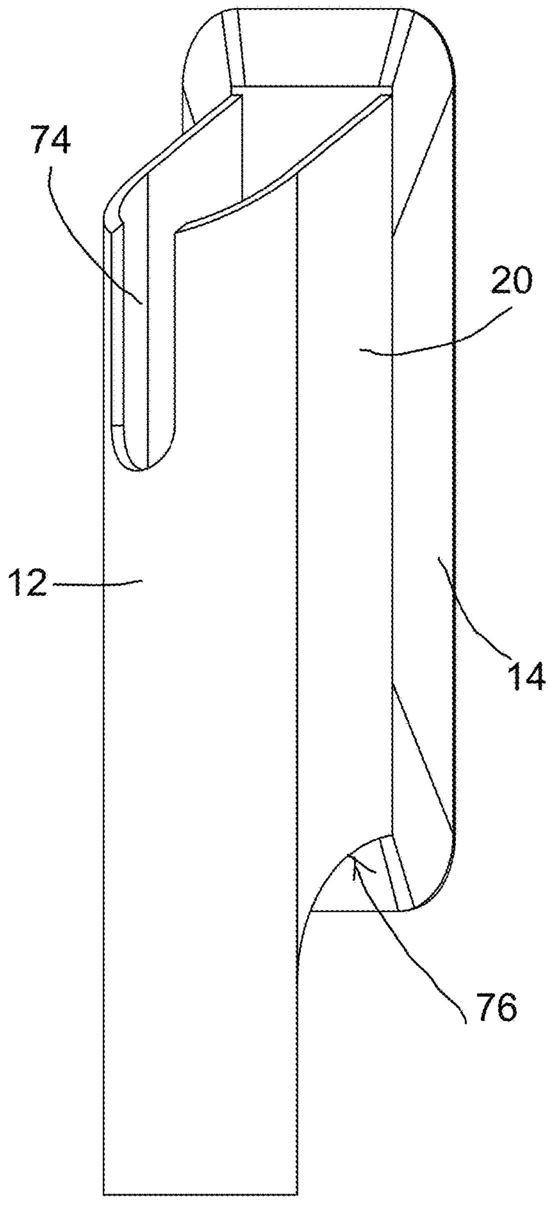
FIGS. 20A-20B illustrate an embodiment of a rod holder component.
Figure 20B:
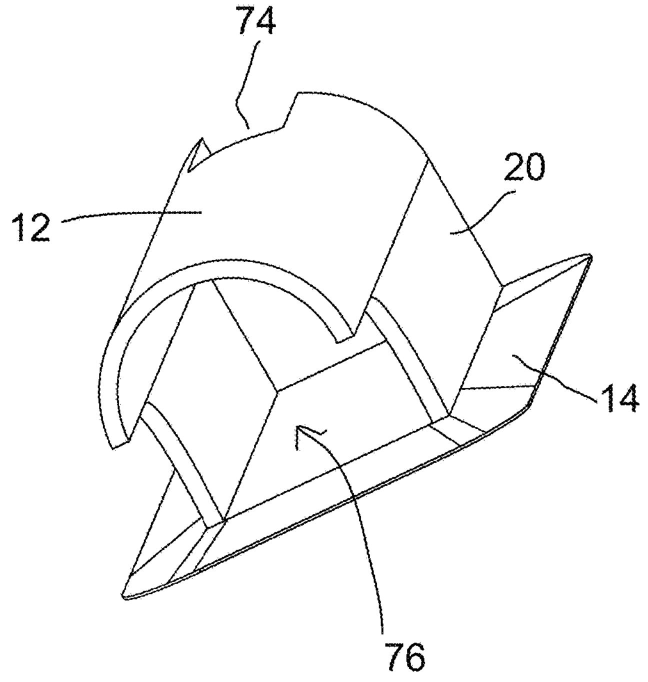

Referring to FIGS. 20A-20B, there is illustrated an exploded perspective view (FIG. 20A) and bottom view (FIG. 20B) of an embodiment of a rod holder component (16). The rod holder component includes a rod holder (12) connected to a base (14). According to aspects and embodiments, the rod holder (12) can be attached to or detached from a base (14) of the rod holder component (16). This embodiment of the rod holder (12) includes a slot (74) and an open bottom (76) which combine with the rigid side walls (20) of the rod holder (12) to hod at least a butt of a fishing rod. Advantages of this embodiment include that the fishing rod is securely held. Another advantage is that this embodiment can be more easily manufactured, for example can be extruded as one integral component. Another advantage is that this embodiment can be more attached to the bag, for example completely stitched or bonded around a periphery of the base (14). According to aspects and embodiments, the base and the rod holder are integrally formed.

Figure 7:
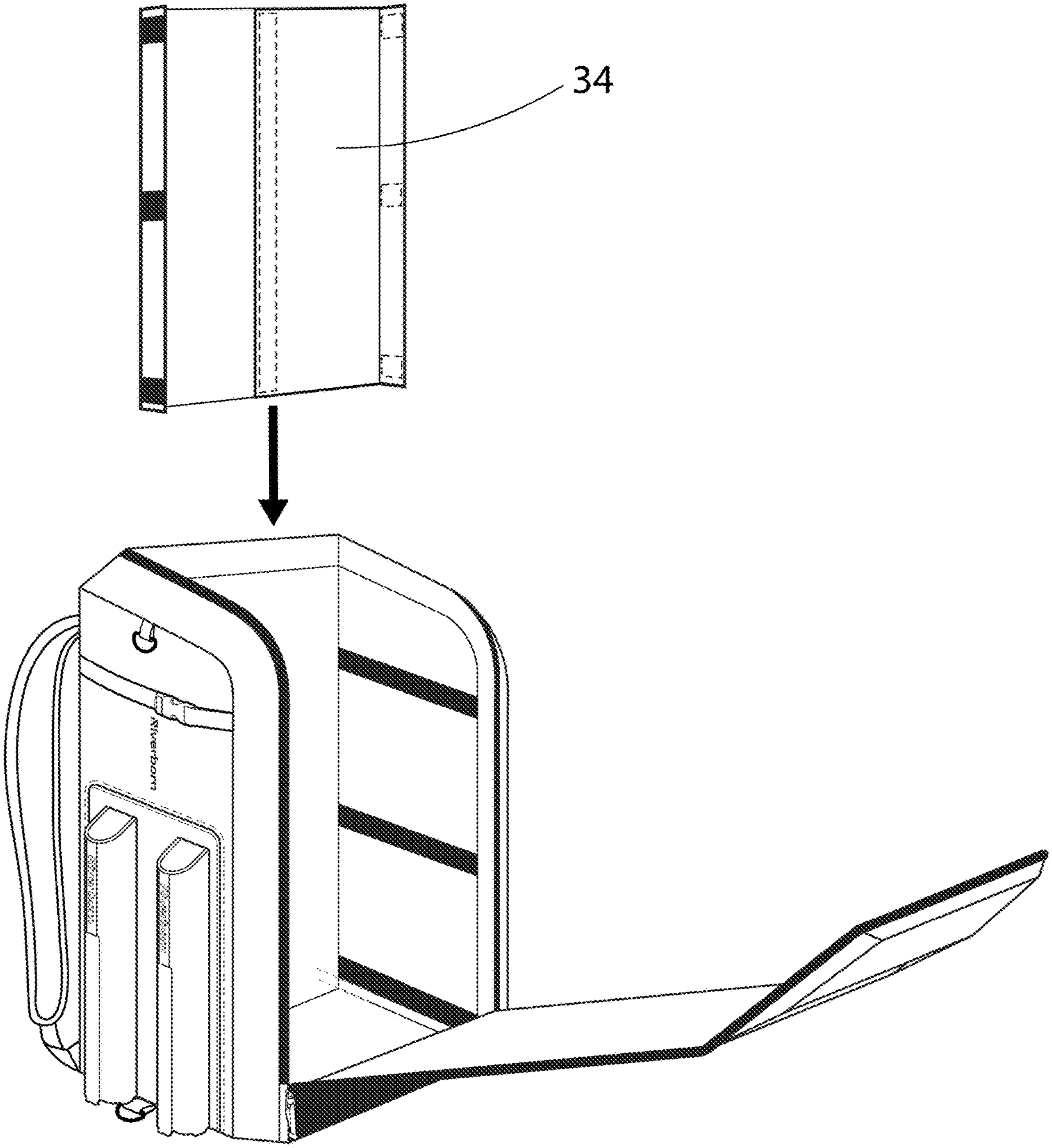
FIG. 7 is a left front perspective view of the embodiment of the backpack of FIG. 1 in an open configuration and further illustrating a rigid support structure being inserted into the backpack.
Figure 8:
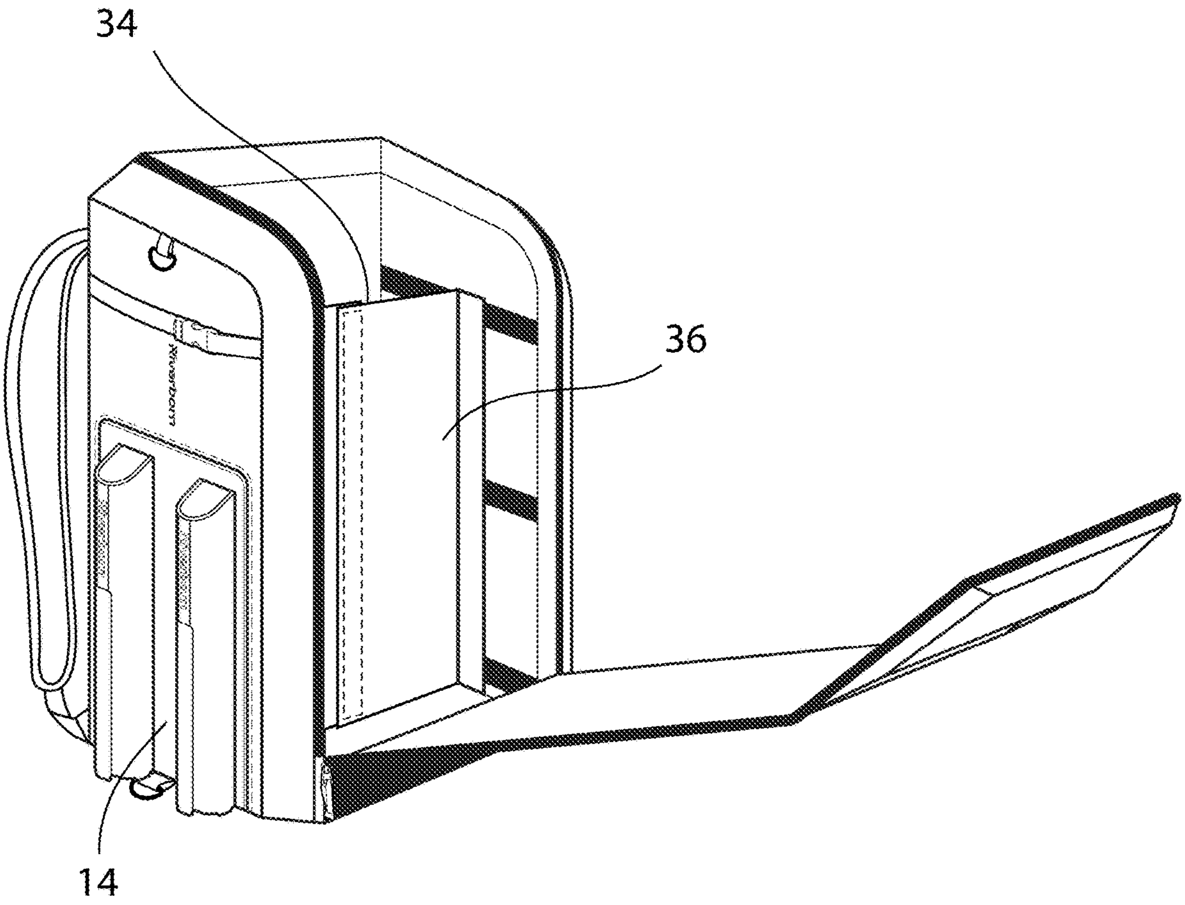
FIG. 8 is a left front perspective view of the embodiment of the backpack of FIG. 1 in an open configuration and further with the rigid support structure in the backpack.

Referring to FIGS. 7-8, there is illustrated the embodiment of the bag in an open condition. Within the bag, a structural element (34) can be provided. The structural element is situated in between and perpendicular to the two rod holder components. The structural element as shown in FIG. 7 can be inserted into the bag, and as shown in FIG. 8 can be situated within the bag perpendicular to the two rod holder components so as to provide support to the bag and to the rod holder components. The structural element has at least one face (36) which is perpendicular to the base (14) of the two rod holder components. The structural component helps create further stability to the bag and rod holders and prevents the fishing rods, when placed inside the rod holders, from interacting with each other.

Figure 9:
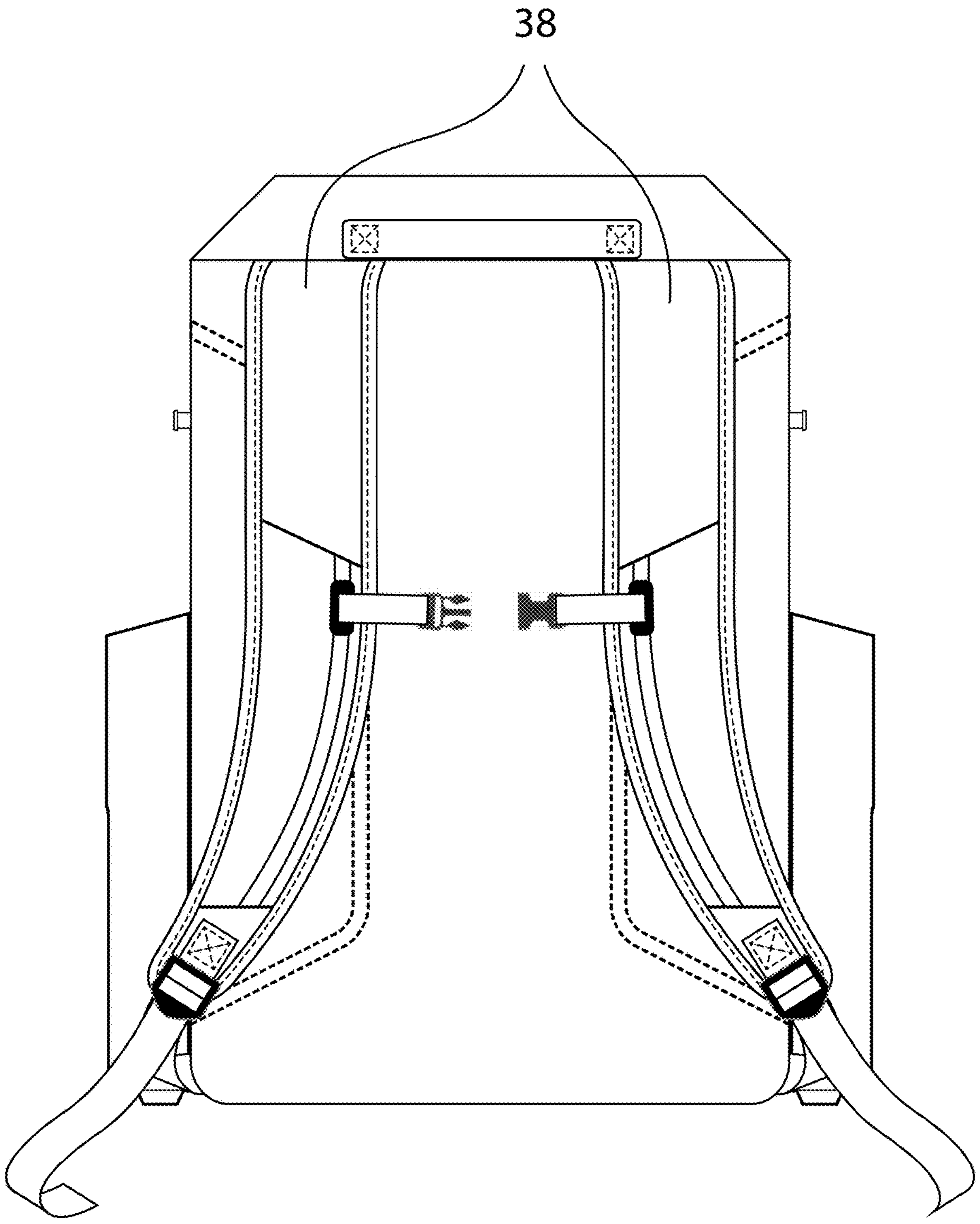
FIG. 9 is a back view of the embodiment of the backpack of FIG. 1.
Figure 10:
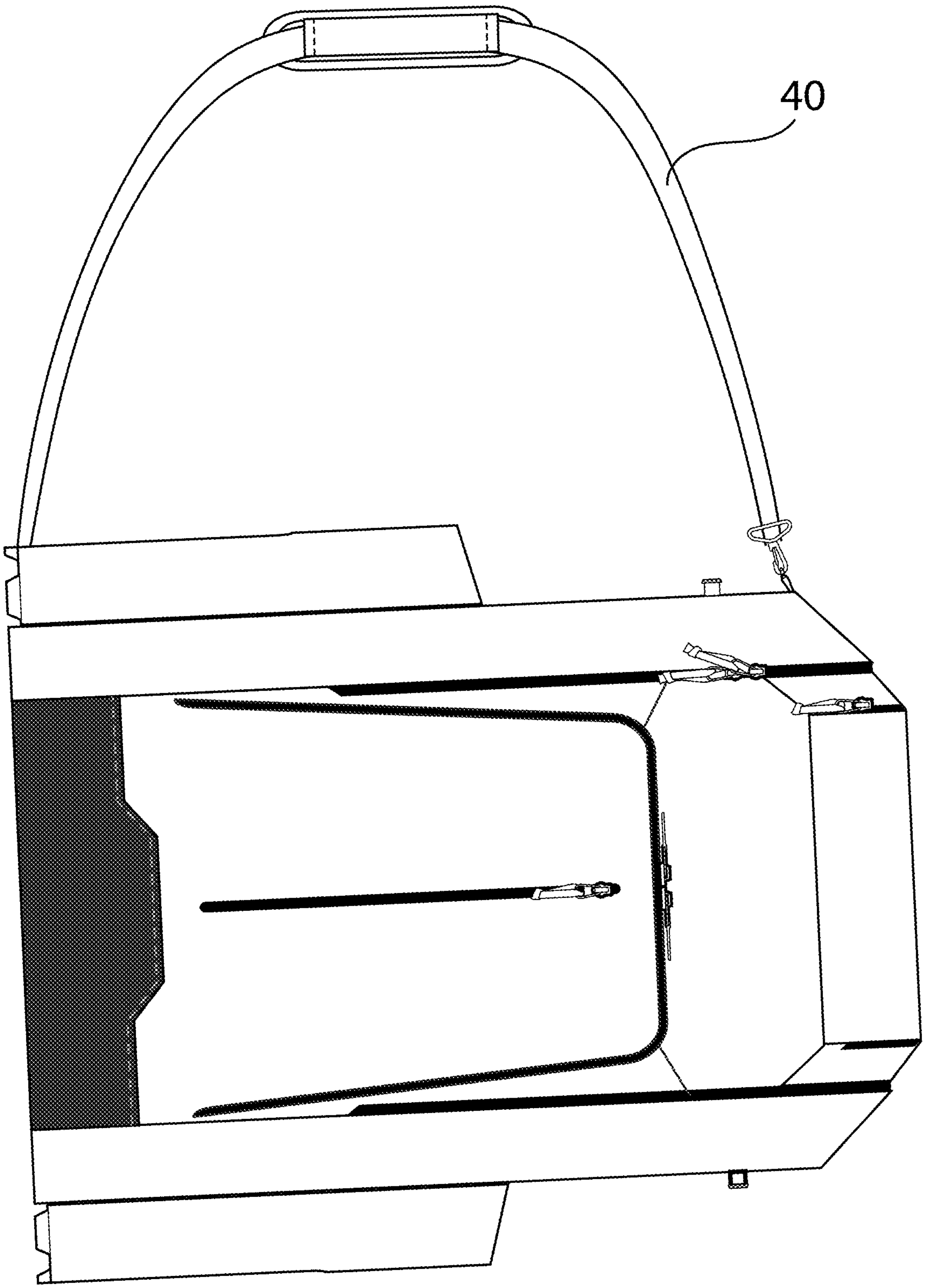
FIG. 10 illustrates the embodiment of the backpack of FIG. 1 configured to be carried with a shoulder strap.

Referring to FIG. 9, according to aspects and embodiments, the bag can have backpack straps (38) attached at the rear side of the bag for carrying the bag. When the bag is carried by the shoulder straps, the fishing rods placed in the rod holders will be oriented vertically, pointed upwards. According to aspects and embodiments the bag can also include a shoulder strap (40) attached at a side of the bag, as shown in FIG. 10, for carrying the bag in a sideways orientation. In this mode, the fishing rods are pointed forward or backward relative to the user. This allows for carrying of the bag with fishing rods oriented to avoid overhead obstacles such as tree branches or human-made structures.

Figure 11A:
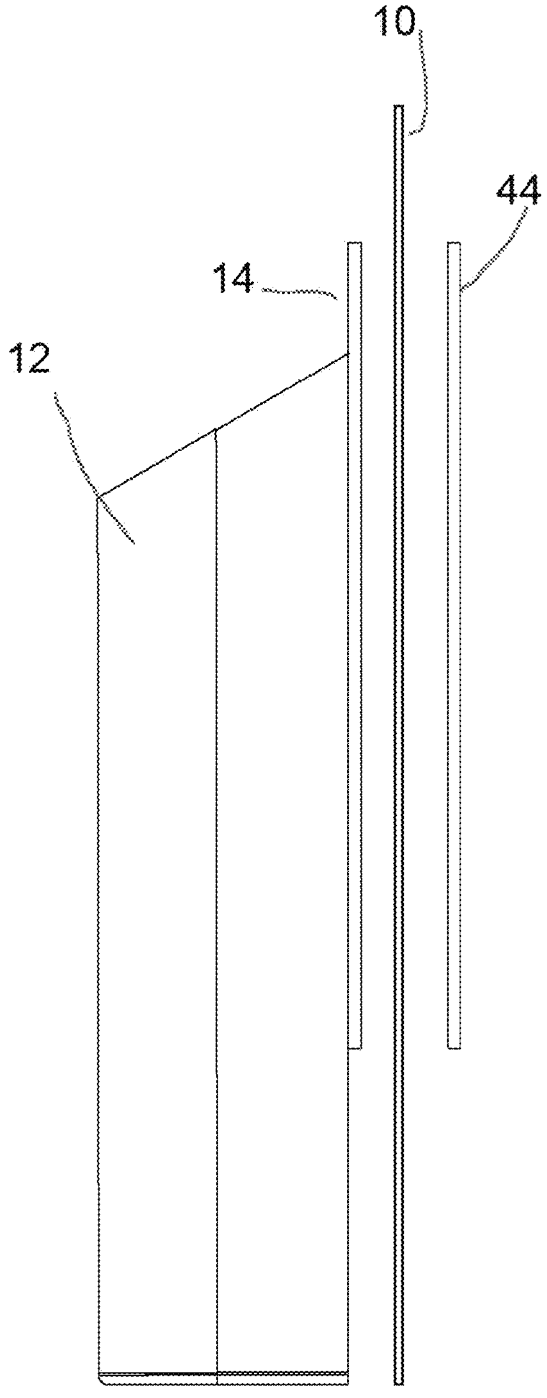
FIGS. 11A-11B illustrate a side view and front view of an embodiment of a rod holder component.
Figure 11B:
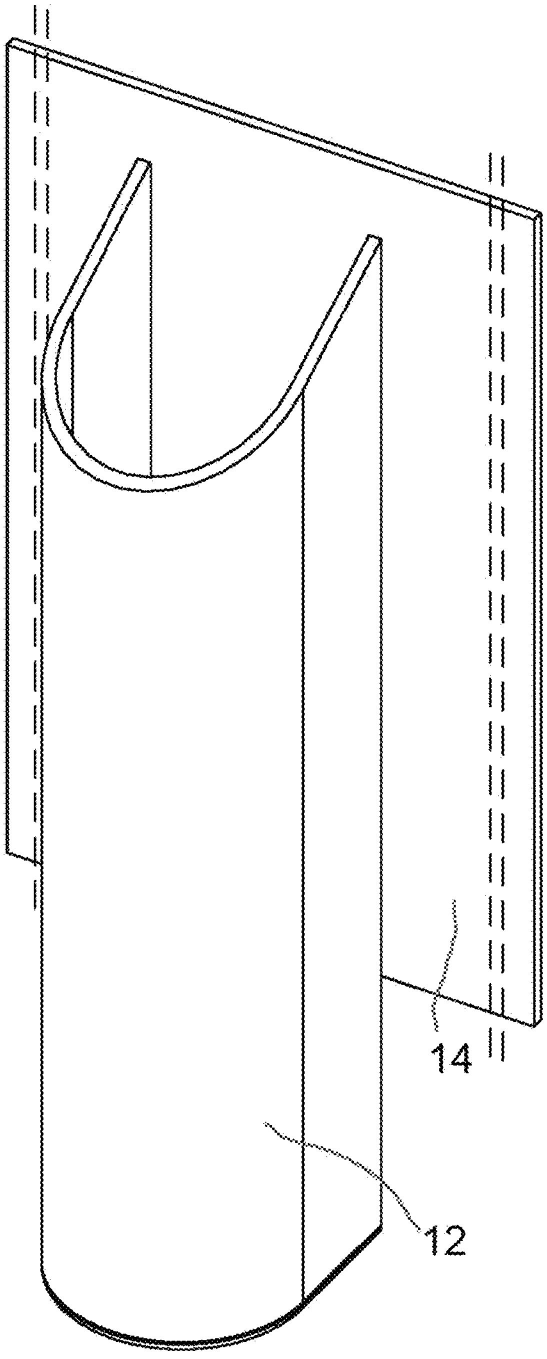

FIGS. 11A-11B illustrate a side view and front view of an embodiment of a rod holder component attachment to the bag. Like reference numbers are used to illustrate like components are have been described herein. FIGS. 11A-11B that the rod holder component, including the rod holder 12 and base 14 can be attached to the fabric of the bag 10 with stitching of the base on two sides of the base 14. In other words, the stitching needs not be around an entire periphery of the base of the rod holder component. FIG. 11A further illustrates that the fabric of the bag 10 is sandwiched between the rod holder component and an internal support structure 44. For example, the internal support structure can be a plastic sheet. It is appreciated that the internal support structure can also be an internal piece of support fabric or another material that helps to maintain the rod holder in place, particularly under a weighted load. It is further appreciated that the bag holder component need not be stitched to the bag, but instead can be riveted, or welded, or connected in any manner described herein and as known by one of skill in the art.

Figure 12:
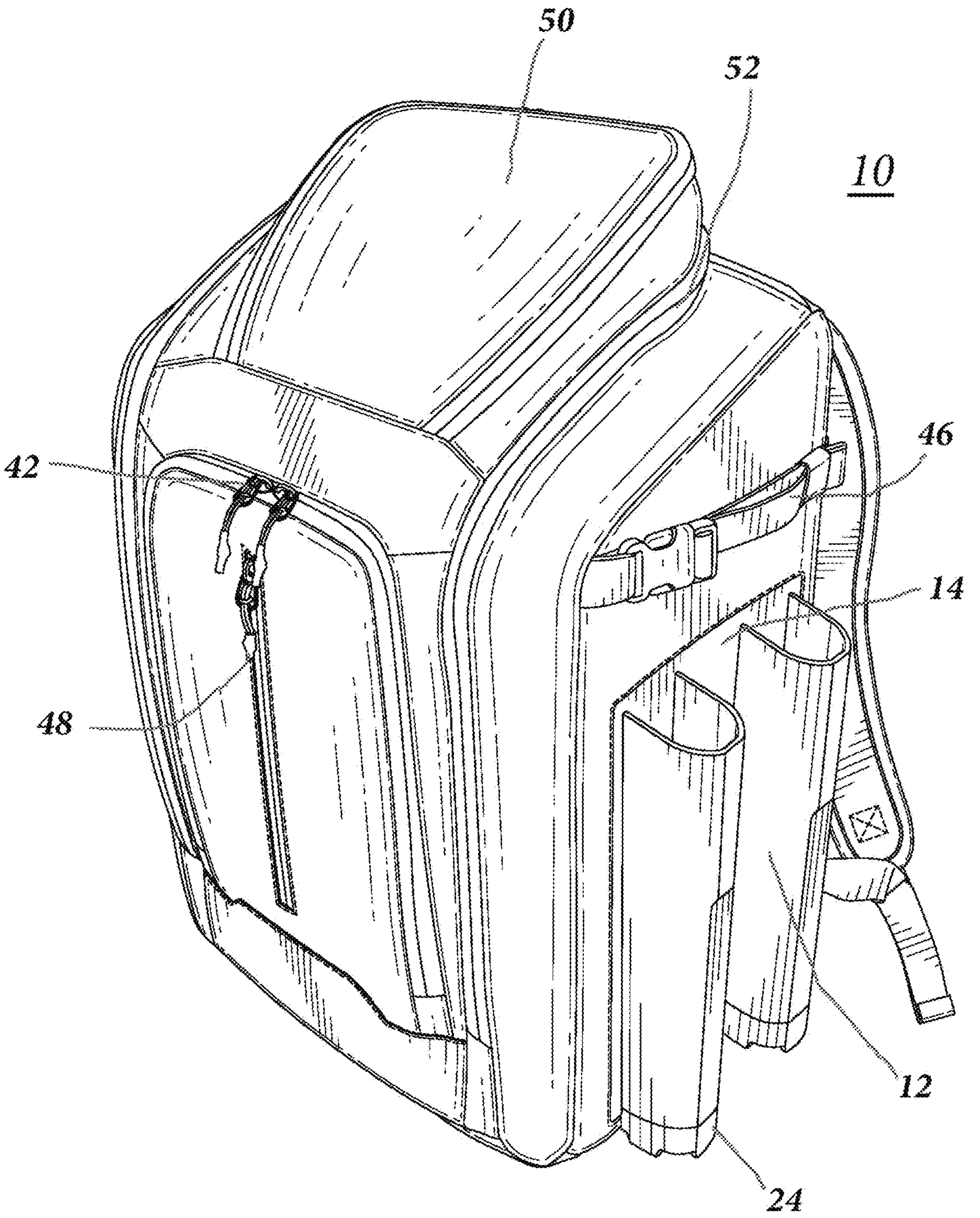
FIG. 12 is a perspective view of an embodiment of a backpack.
Figure 13:
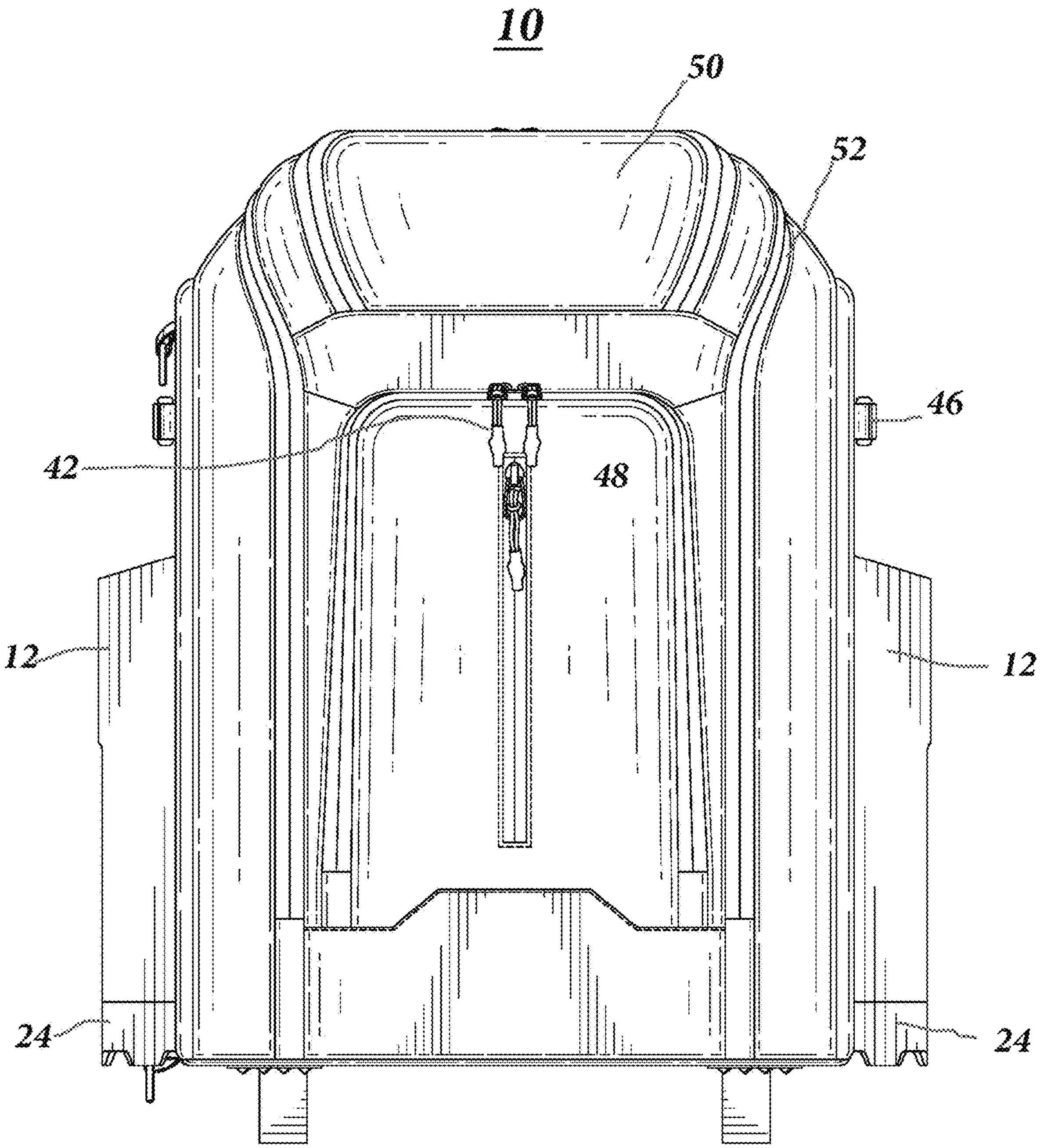
FIG. 13 is a front view of the embodiment of a backpack of FIG. 12.
Figure 14:
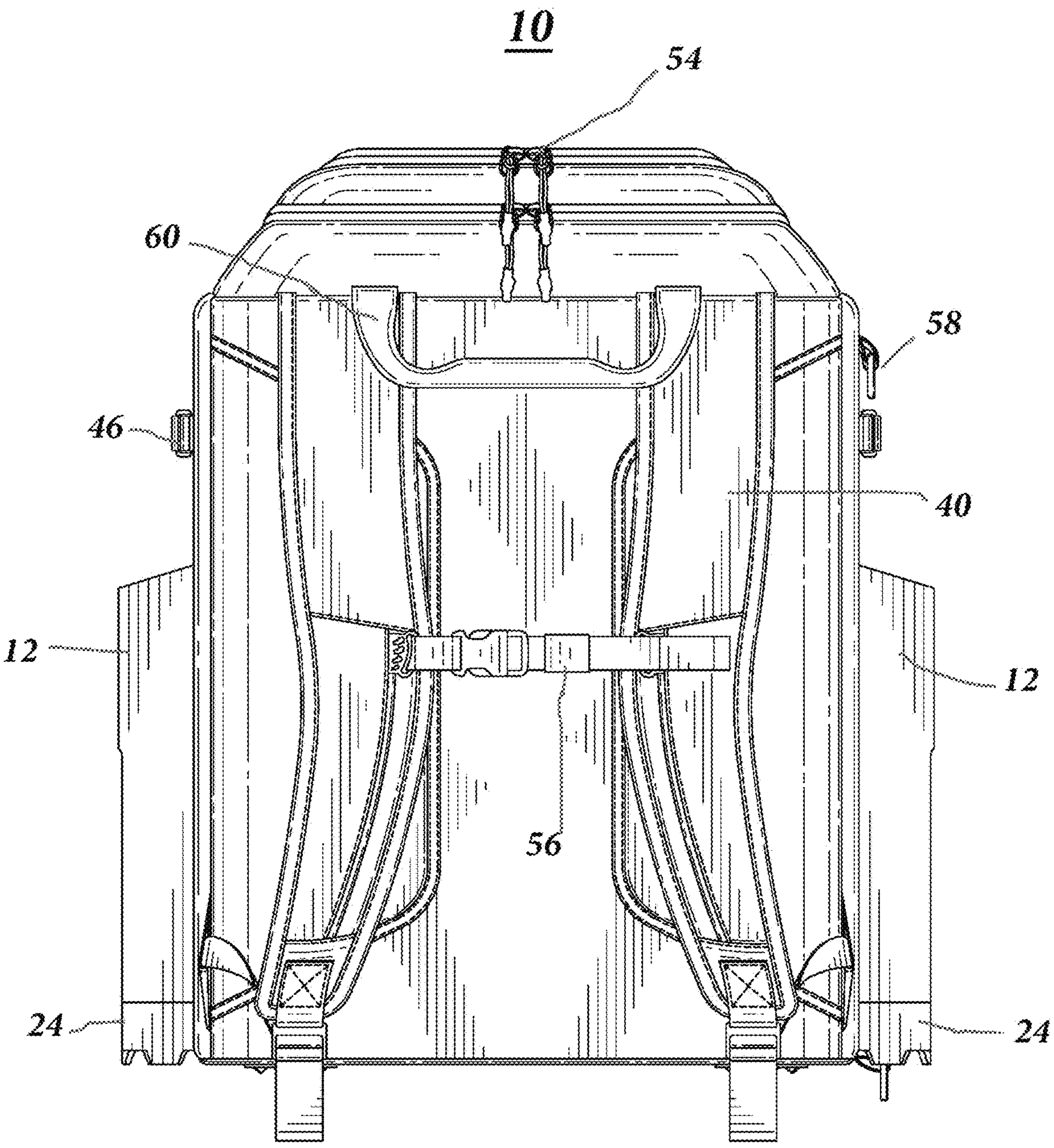
FIG. 14 is a back view of the embodiment of a backpack of FIG. 12.
Figure 15:
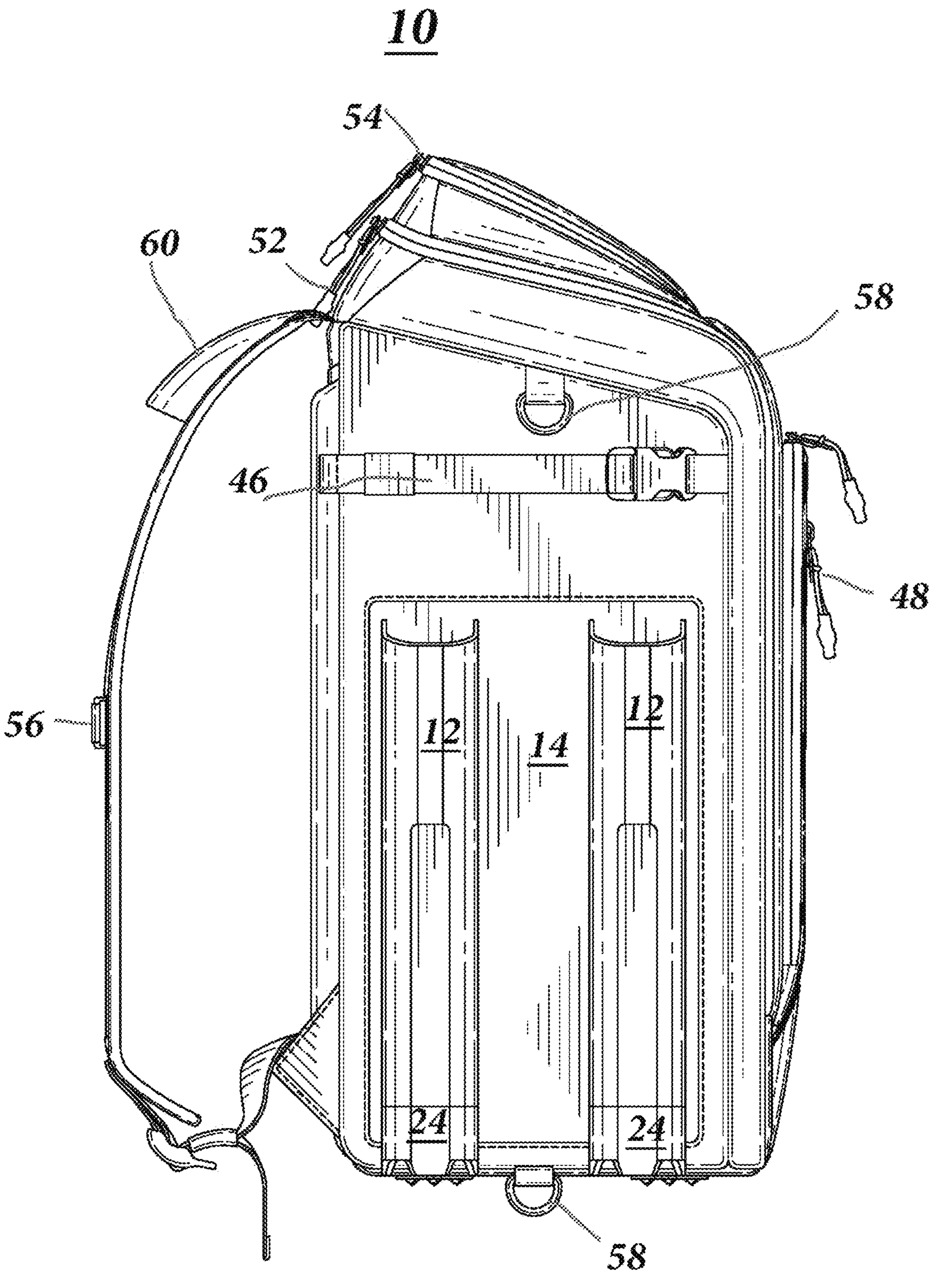
FIG. 15 is a left side view of the embodiment of a backpack of FIG. 12.
Figure 16:
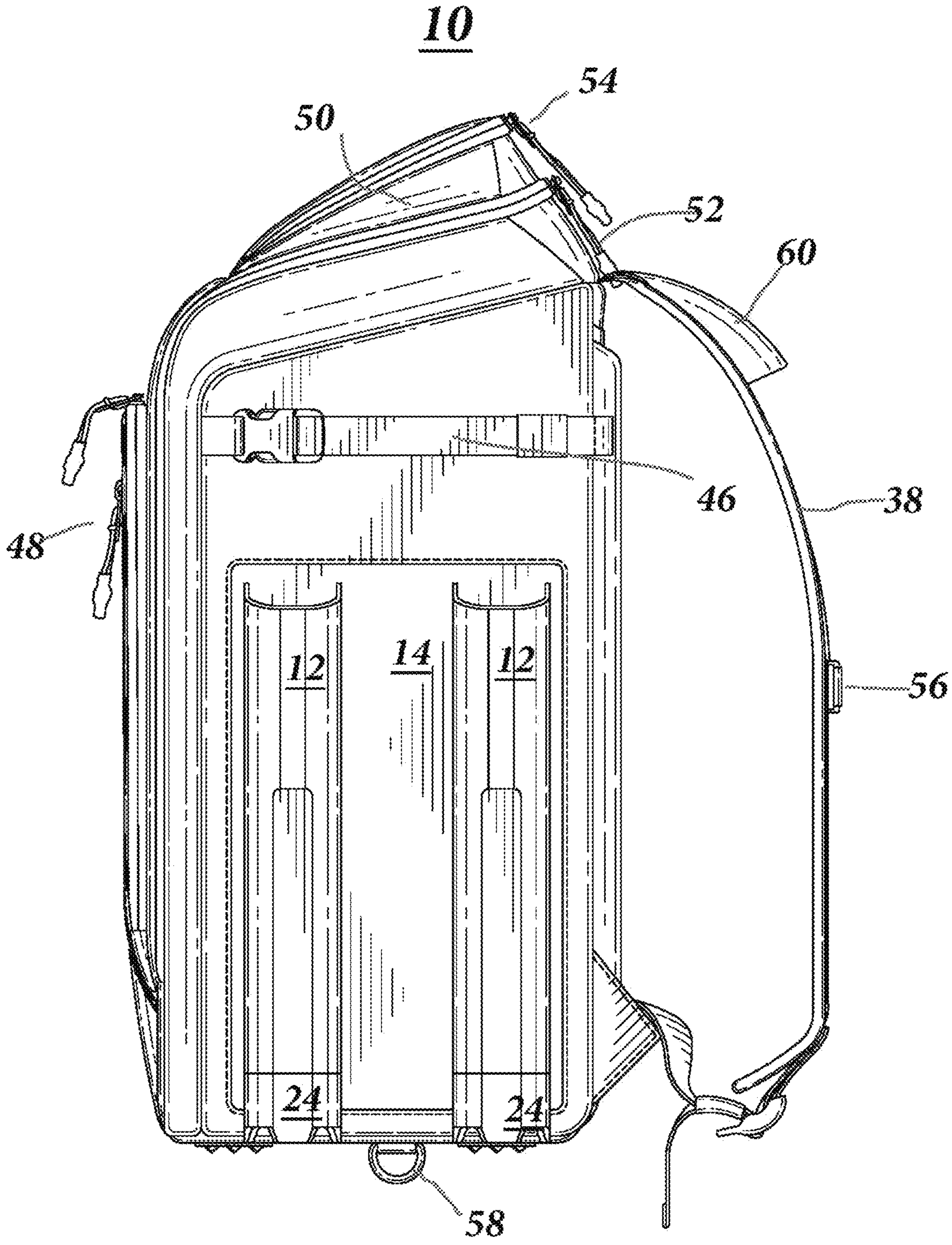
FIG. 16 is a right side view of the embodiment of a backpack of FIG. 12.
Figure 17:
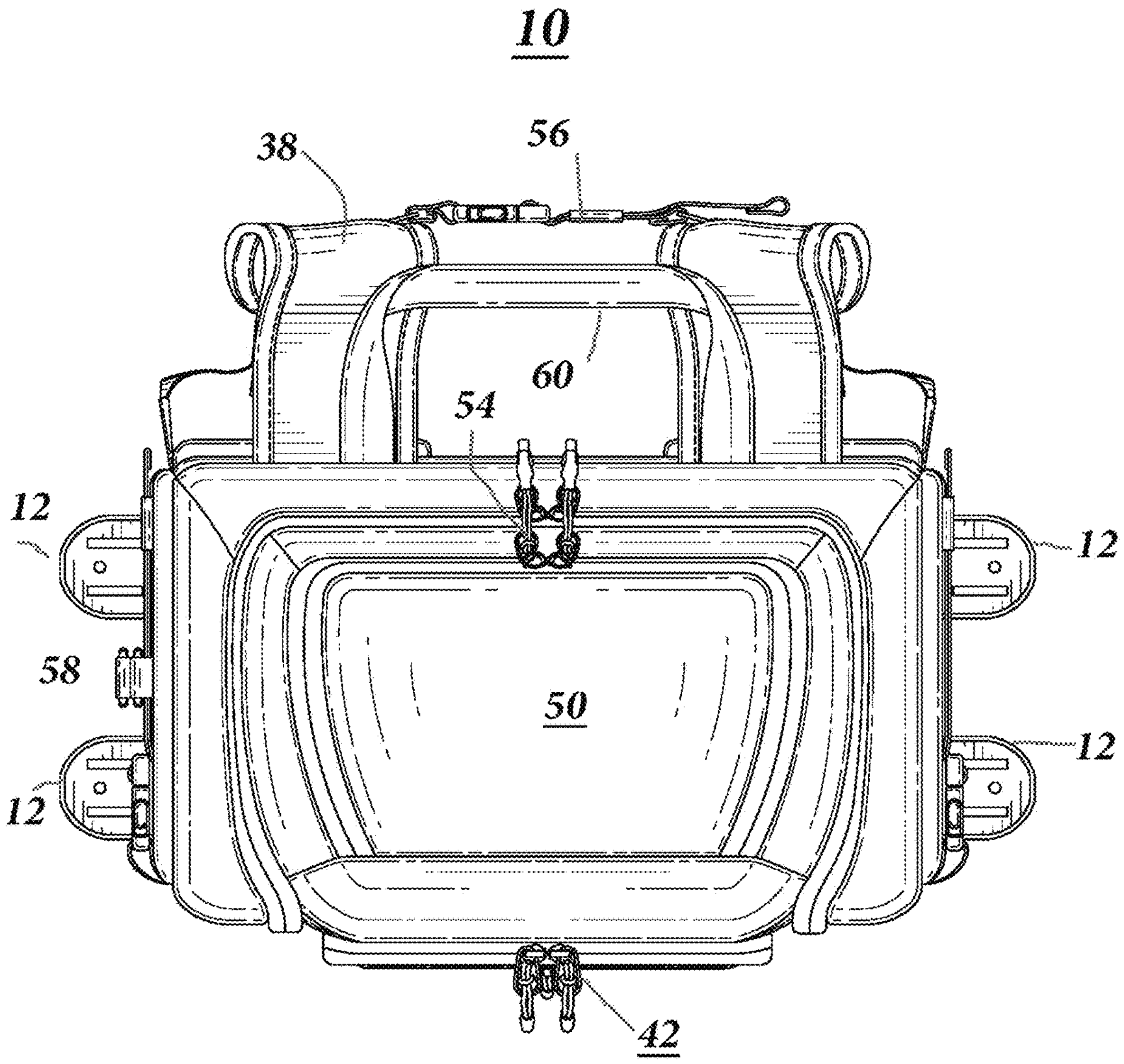
FIG. 17 is a top view of the embodiment of a backpack of FIG. 12.
Figure 18:
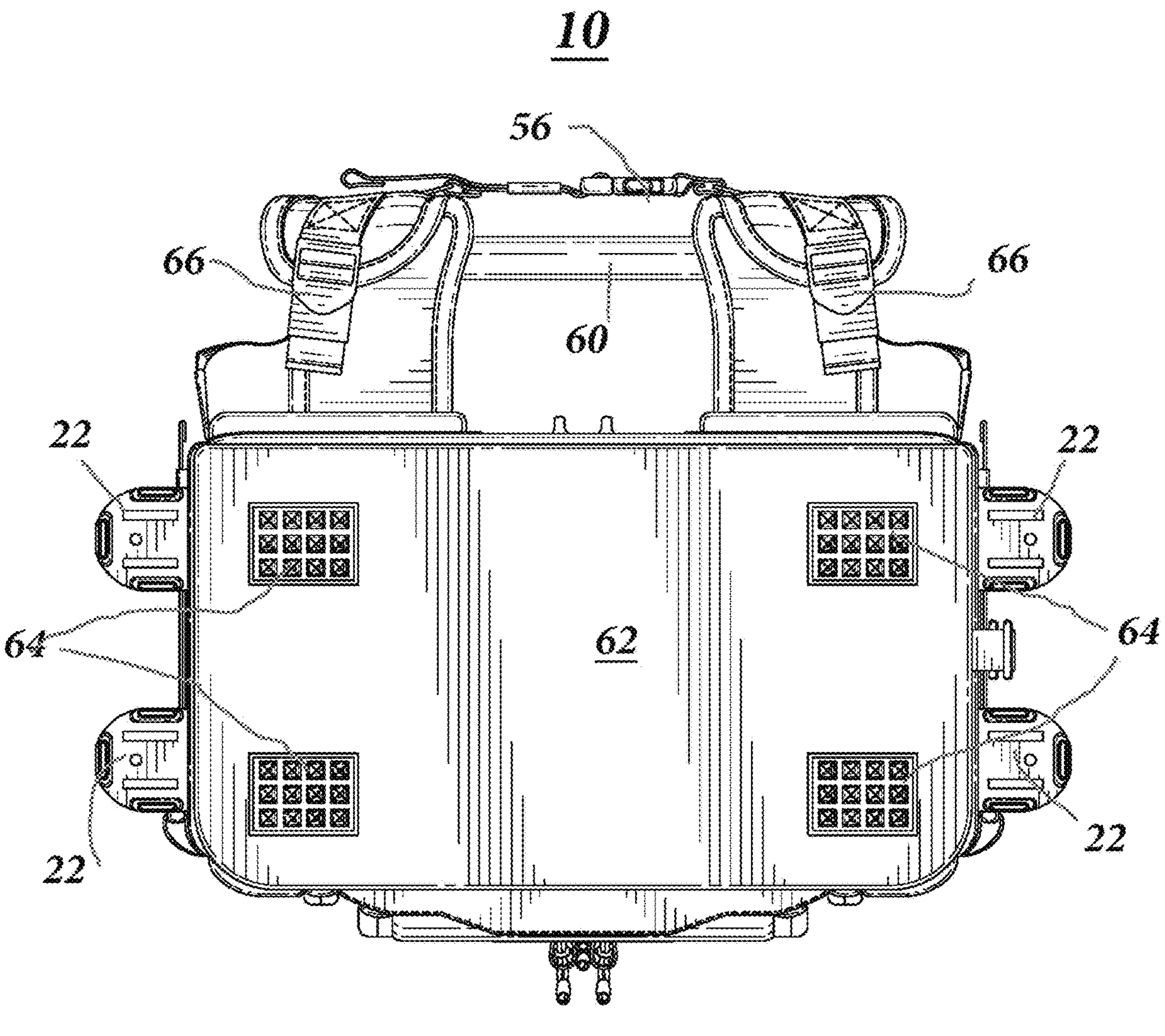
FIG. 18 is a bottom side view of the embodiment of a backpack of FIG. 12.

Referring to FIGS. 12-18, there is illustrated another embodiment of a backpack of the disclosure. FIG. 12 is a perspective view of the embodiment of a backpack. FIG. 13 is a front view of the embodiment of the backpack. FIG. 14 is a back view of the embodiment of the backpack. FIG. 15 is a left side view of the embodiment of the backpack. FIG. 16 is a right side view of the embodiment of the backpack. FIG. 17 is a top view of the embodiment of the backpack. FIG. 18 is a bottom view of the embodiment of the backpack. In FIGS. 12-18, like reference numbers are used for like elements have been described herein, and for the sake of brevity a description of the like elements is not provided.

Aspects and embodiments of the embodiment of the backpack of FIGS. 12-18 include that the backpack includes a rod holder support strap 46. The rod holder support strap includes a buckle fastener. The rod holder support strap can be opened and wrapped around the fishing rods held by the rod holders 12, and then snapped to a closed position to provide further support for holding the fishing rods in a secure position with respect to the backpack. It is appreciate that the support strap can be adjusted in length to allow for tightness of the strap to the body of the backpack. It is appreciated that the fastener can also be a hook and loop fastener or any other fastener known to one of skill in the art.

Aspects and embodiments of the embodiment of the backpack of FIGS. 12-18 include that the backpack includes a top pocket 50. The top pocket is a smaller pocket than the main pocket of the backpack. The top pocket can be opened and closed to access the top pocket by a top pocket zipper closure 56. The main pocket can also be opened and closed to access the main pocket by a main pocket zipper closure 52. It is appreciated that although the pocket closures are zipper closure, any closure device known to one of skill in the art can be used.

Aspects and embodiments of the embodiment of the backpack of FIGS. 12-18 include that the backpack includes shoulder straps 38. According to the embodiment of FIGS. 12-18, the shoulder straps are connected by a shoulder strap support strap 56. The shoulder strap support strap includes a buckle fastener. The buckle fastener can be adjusted to adjust a length of the support strap. The embodiment of FIGS. 12-18 further includes shoulder strap adjustment fasteners 66 that enable adjustment of a length of each shoulder strap. It is appreciated that the shoulder straps adjustment fasteners 66 can be any adjustment fastener as known by one of skill in the art. It is appreciated that the shoulder strap support fastener can be any fastener known to one of skill in the art.

Aspects and embodiments of the embodiment of the backpack of FIGS. 12-18 include that the backpack includes at least one loop attachment 58. The loop attachment is provide to allow for attaching items to be carried to the backpack, for example, by a clip such as a carabiner clip. It is appreciated that the backpack can have one or more loop attachments and the loop attachment can be provide a various locations on the backpack.

Aspects and embodiments of the embodiment of the backpack of FIGS. 12-18 include that the backpack includes at least one handle 60. The handle 60 is provided at a back side of the backpack near a top of the backpack between the shoulder straps. It is appreciated that the handle can be made of a strap material or any other material known to one of skill in the art. It is appreciated that the handle can be placed at other locations on the backpack, or that the backpack can be provided with more than one handle.

Aspects and embodiments of the embodiment of the backpack of FIGS. 12-18 include that the backpack includes footing 64 on a base surface 62 of the backpack. The backpack is provided with four such footings 64. The footings 64 in combination with the bottom 22 of the rod holders 12 together combine to provide stability to the backpack when the backpack is placed on a surface, for example, so that the backpack does not tip over. It is appreciated that any number of footings can be provide. It is appreciated that the footing can be made of plastic, rubber or any other material known to one of skill in the art. It is appreciate that the width and length of the footing is appropriately sized for the size and dimensions of the backpack.

According to aspects and embodiments, the rod holders are made of a rigid material. According to aspects and embodiments, the material of the rod holders is a stitchable resin with suitable impact strength and dimensional stability such as Nylon 6 or Nylon 66.

According to aspects and embodiments, the rod holder component is a formed of a singular continuous material (not assembled from multiple parts).

According to aspects and embodiments, the rod holder interior cavity has a diameter between 33 mm-45 mm. According to aspects and embodiments, the rod holder interior cavity has a minimum sidewall height "H" of 130 mm, and is preferably 250 mm and above.

According to aspects and embodiments, the rod holders are spaced a minimum of 40 mm apart or more.

According to aspects and embodiments, the bag can be provided with multiple tailored geometries of rod holders available for many rod and reel combinations, which would result in increased stability.

According to aspects and embodiments, each rod holder component has one or more apertures that allow mechanical fasteners such as rivets, screws, or heat stakes to pass through the apertures for secure the rod holder component to the bag. According to aspects and embodiments, mechanical fasteners such as rivets, screws, or heat stakes can be used to attach the rod holder component to a bag.

According to aspects and embodiments, each rod holder component has a flange that enables the rod holder component to be attached to a bag via welding techniques such as high frequency welding, welding via heat press, welding utilizing hotmelt glue, pressure or any combination of the above.

According to aspects and embodiments, each rod holder component is injection molded with one or more stakes that protrude from its base, the stakes can be passed through apertures of other component(s) of a bag. Heat or high frequency is applied to a portion of the stakes to turn it into molten plastic, and those portions are reshaped into caps that mechanically attach the rod holder component to other component(s) of a bag.

According to aspects and embodiments, each rod holder has a leg element and side wall(s). According to some embodiments, the rod holder component is attached to at least one intermediary component which is attached to a bag. The intermediary component(s) may be mechanically fastened or welded to the bag. It is appreciated that a weld as used herein is a mechanical fastening and can include for example connection by RF welding (causing two separate pieces to heat up and reform into a new and combined shape), as well as other types of welding known to one of skill in the art. An example of an intermediary component is a base that is stitched to the outside of the bag.

According to aspects and embodiments, the body of the backpack may be made of a material comprising fabric or nylon. According to aspects and embodiments, the backpack may include a reinforcing material. According to aspects and embodiments, the backpack may include one or more pieces of reinforcing material.

According to aspects and embodiments, one or more of the closures for pockets of the backpack is a zipper closure. In some embodiments, the zipper closure is a nylon zipper closure. However, it is appreciated that any of the closures disclosed herein can be other fasteners, such as a hook and loop fastener, a magnetic fastener, a clasp, or another fastener known and used by one of skill in the art.

According to other aspects and embodiments, a user may secure attachments to backpack, for example with a clip that attached to the backpack through a loop or to a strap of the backpack. For example, the clip can be a carabiner clip that is made of metal or plastic. The clip may be selectively secured to a loop, a strap, or another feature on the backpack. For example, the clip may be secured to loop affixed to a shoulder strap of the backpack or a loop on the side of the backpack.

According to aspects and embodiments, the dimensions of the backpack are 20" Tall×16.5" Wide (including the rod holders)×9" Deep. It is appreciated that the backpack of the present disclosure may have different dimensions. An Embodiment of the foldable back is a total weight of no more than 4.6 pounds.

Some advantages of the aspects and embodiments of a backpack disclosed herein are as follows: While being used in the backpack orientation, it keeps the rods close to the center of gravity of the user such that the energy exerted to carry the rods and maintain balance is minimized. Another advantage is that the leg components of the rod holders allow the entire backpack with rods and tackle to stand upright. This protects from sand and dirt getting into the delicate mechanics of the reel, damage of the rods through accidents, and allows the backpack to function as a rod station while the user engages in fishing activities. Another advantage of backpack is that it facilitates two carry methods: as a backpack or as a side-carry bag, which provides the flexibility to the user to navigate different terrain. In the backpack orientation, the users can use their hands to maintain balance, carry additional gear, or cast a fishing rod to continuously search for fish while moving. In the side carry mode, the user can go under trees and other over-head obstacles without having to take their fishing rods out of the rod holders.

While the disclosed subject matter is described herein in terms of certain exemplary embodiments, those skilled in the art will recognize that various modifications and improvements can be made to the disclosed subject matter without departing from the scope thereof. As such, the particular features claimed below and disclosed above can be combined with each other in other manners within the scope of the disclosed subject matter such that the disclosed subject matter should be recognized as also specifically directed to other embodiments having any other possible permutations and combinations. It will be apparent to those skilled in the art that various modifications and variations can be made in the systems and methods of the disclosed subject matter without departing from the spirit or scope of the disclosed subject matter. Thus, it is intended that the disclosed subject matter include modifications and variations that are within the scope of the appended claims and their equivalents.

What is claimed:

1. A bag comprising:

a side wall;

at least one rod holder component attached to the side wall, the at least one rod holder component including one or more tubular rod holders having rigid side walls, an open top end and a bottom end, each rod holder sized and arranged for holding a fishing rod;

a base attached to the one or more rod holders, the base including a flange extending about a periphery of the base, the flange being welded to the side wall of the bag about an entire periphery of the flange;

wherein the one or more rod holders includes a detachable a leg element adapted to interface with the bottom end of the one or more rod holders;

wherein the leg element interfaces with the bottom end of the one or more rod holders via aligning elements of the leg element and the bottom end of the one or more rod holders; and wherein the aligning elements of the bottom end of the one or more rod holders extend either downwardly away from the bottom end of the one or more rod holders or at least partially across the bottom end of the one or more rod holders.

2. The bag of claim 1, wherein the flange is RF welded to the bag about the entire periphery of the flange.

3. The bag of claim 1, wherein the aligning elements include directional tongue and groove elements and a detent with male and female elements.

4. The bag of claim 1, wherein the detachable leg element is detachable from the bottom end of the respective tubular rod holder to permit manufacturing-machine access to the flange around the entire periphery of the flange.

5. A bag having at least one rod holder component attached to a side wall of the bag, each of the at least one rod holder component including one or more tubular rod holders having rigid side walls, an open top end and a bottom end, each of the one or more rod holders sized and arranged for holding a fishing rod, each of the at least one rod holder component including a base for attaching the respective rod holder component to the bag, wherein the base includes a stitching flange about a periphery of the base that is stitched to the bag around a full perimeter of the stitching flange;

wherein each of the one or more rod holders includes a detachable leg element adapted to interface with the bottom end of the one or more rod holders;

wherein the detachable leg element adapted to interface with the bottom end of the respective rod holder has an interface with first aligning elements that align with the bottom end of the respective rod holder; and wherein the bottom end of the respective rod holder has second aligning elements that extend either downwardly away from the bottom end of the respective rod holder or at least partially across the bottom end of the respective rod holder.

6. The bag of claim 5, wherein the detachable leg element is detachable from the bottom end of the respective tubular rod holder to permit stitching-machine access to the stitching flange around the full perimeter of the stitching flange.

7. The bag of claim 5, wherein the first and second aligning elements include directional tongue and groove elements and a detent with male and female elements.

8. A bag having at least one rod holder component attached to a side wall of the bag, each of the at least one rod holder component including one or more tubular rod holders having rigid side walls, an open top end and a bottom end, each of the one or more rod holders sized and arranged for holding a fishing rod, each of the at least one rod holder component including a base for attaching the respective rod holder component to the bag, wherein the base includes a stitching flange about a periphery of the base that is stitched to the bag around a full perimeter of the stitching flange, and wherein each of the one or more rod holders includes a detachable leg element configured to be attached to the bottom end of the respective rod holder and detachable from the bottom end of the respective rod holder;

wherein the detachable leg element of each of the one or more tubular rod holders is adapted to interface with the bottom end of the respective tubular rod holder;

wherein the detachable leg element has an interface with first aligning elements that align the detachable leg element with the bottom end of the respective tubular rod holder; and wherein the bottom end of respective tubular rod holder has second aligning elements that extend either downwardly away from the bottom end of the respective tubular rod holder or at least partially across the bottom end of the one or more rod holders.

9. The bag of claim 8, wherein the stitching flange is integral to and on at least two sides of the base.

10. The bag of claim 8, wherein the stitching flange is stitched to the side wall of the bag with a continuous stitch surrounding the full perimeter of the stitching flange.

11. The bag of claim 8, wherein the rigid side walls of each of the one or more tubular rod holders comprise at least two vertical side walls which are substantially parallel.

12. The bag of claim 8, wherein the rigid side walls of each of the one or more tubular rod holders form a cylindrical shape.

13. The bag of claim 8, wherein the first and second aligning elements include directional tongue and groove elements and a detent with male and female elements.

14. The bag of claim 8, wherein the first and second aligning elements include directional tongue and groove elements and a detent with male and female elements.

15. The bag of claim 8, wherein the base is assembled with the one or more tubular rod holders.

16. The bag of claim 8, wherein each of the one or more tubular rod holders includes a rigid bottom.

17. The bag of claim 8, further comprising an internal structural element secured at least one side wall of the bag, the internal structural element having sides parallel to the rigid side walls of the one or more tubular rod holders, and the internal structural element having a longitudinal face which is perpendicular to the at least one rod holder component.

18. The backpack of claim 8, wherein the at least one rod holder component is integrally formed.

19. The bag of claim 8, wherein the detachable leg element is detachable from the bottom end of the respective tubular rod holder to permit stitching-machine access to the stitching flange around the full perimeter of the stitching flange.

* * * * *